(12) United States Patent
Bauer et al.

(10) Patent No.: US 6,972,102 B1
(45) Date of Patent: Dec. 6, 2005

(54) METHOD AND DEVICE FOR CONTINUALLY PRODUCING AN EXTRUSION SOLUTION

(75) Inventors: Ralf-Uwe Bauer, Rudolstadt (DE); Uwe Kind, Rudolstadt (DE)

(73) Assignee: Zimmer AG, Frankfurt (DE)

( * ) Notice: Subject to any disclaimer, the term of this patent is extended or adjusted under 35 U.S.C. 154(b) by 396 days.

(21) Appl. No.: 10/088,773

(22) PCT Filed: Sep. 29, 2000

(86) PCT No.: PCT/DE00/03411

§ 371 (c)(1),
(2), (4) Date: Jun. 24, 2002

(87) PCT Pub. No.: WO01/27161

PCT Pub. Date: Oct. 15, 1999

(30) Foreign Application Priority Data

Oct. 15, 1999 (DE) ............... 199 49 720

(51) Int. Cl.[7] ............ C08B 1/00; D01F 2/00; C08J 5/18
(52) U.S. Cl. .......... 264/187; 264/207; 264/191; 264/200; 106/217.5; 366/91
(58) Field of Search .......... 264/187, 191, 264/195, 200, 349, 207, 177.11, 211.11; 106/200.3, 106/217.5; 366/79, 83, 91, 271

(56) References Cited

U.S. PATENT DOCUMENTS 6,610,134 B1 * 8/2003 Kind et al. ............... 264/349

FOREIGN PATENT DOCUMENTS

| DE | 44 39 149 A1 | 5/1996 |
|----|----|----|
| DE | 19837210 C1 | 11/1999 |
| WO | WO 96/33302 | 10/1996 |

* cited by examiner

Primary Examiner—Sue A. Purvis
(74) Attorney, Agent, or Firm—Marianne Fuierer; Steven J. Hultquist

(57) ABSTRACT

The invention relates to a method for continually producing an extrusion solution for producing cellulosed shaped bodies, such as fibres and films, according to the lyocell method. According to the inventive method, (a) a cellulose suspension is produced from cellulose and an aqueous phase in a mass ratio ranging from 1:3 to 1:40, whereby shearing is maintained for between 5 to 200 minutes. (b) The cellulose suspension is dewatered to form a material having a cellulose content ranging from 20 to 80 mass % and the aqueous phase produced thereby is at least partially returned to step (a). (c) The humid cellulose material being homogenised is transported through a first shearing zone in the absence of N-methylmorpholine-N-oxide. (d) The cellulose material is transported through a second shearing zone after sufficient aqueous N-Methyl-morpholine-N-oxide has been added to the homogenised cellulose material so that, after mixing, a suspension having a N-Methylmorpholine-N-oxide content ranging from 70 to 80 mass % in the liquid phase is obtained. The cellulose material or the suspension completely fills in the available cross-section of transport in the shearing zones and (e) the produced cellulose suspension being sheared is converted into the extrusion solution in aqueous N-Methyl-morpholine-N-oxide, whereby water evaporates.

15 Claims, 1 Drawing Sheet

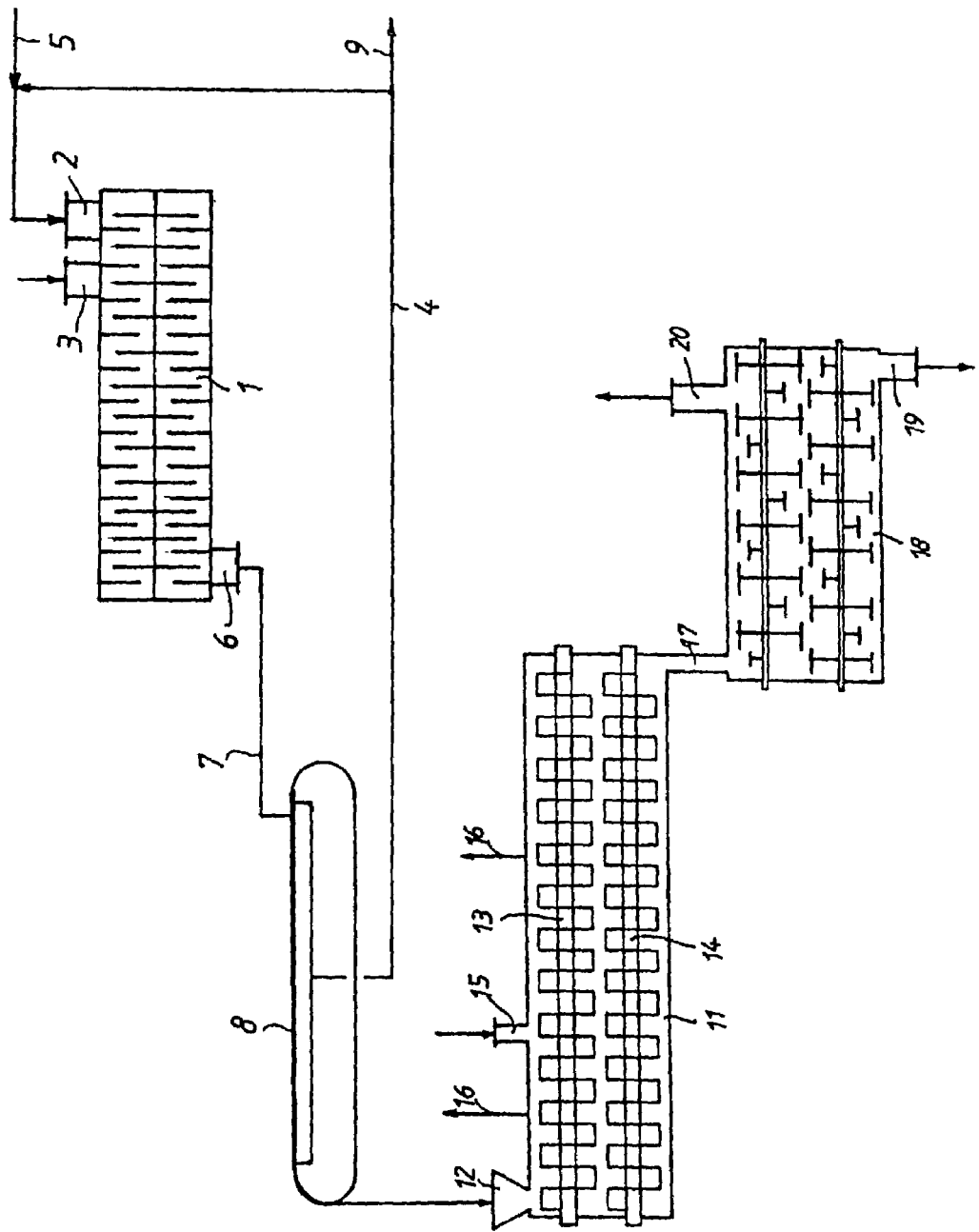

METHOD AND DEVICE FOR CONTINUALLY PRODUCING AN EXTRUSION SOLUTION

CROSS-REFERENCE TO RELATED APPLICATIONS

This application is filed under the provisions of 35 U.S.C. §371 and claims the priority of International Patent Application No. PCT/DE00/03411 filed Sep. 29, 2000, which in turn claims priority of German Patent Application No. 199 49 720.6 filed Oct. 15, 1999.

The present invention relates to a method for the continuous production of an extrusion solution for the formation of cellulose molded bodies, such as fibers and films, according to the lyocell method. The present invention also relates to a device for performing the method.

A discontinuous method for producing a suspension of cellulose in aqueous aminoxide is known from WO 94/28217. In this case, shredded cellulose and an aminoxide solution are mixed in a horizontal mixing chamber by a rotor having radial stirring elements. Twenty-one minutes is given as the duration for one batch. This mode of operation is disadvantageous because, due to the continuous feeding of the subsequent dissolving stage, two such mixing chambers have to be operated. In addition, the complete emptying of the mixing chambers is connected with difficulties.

A semicontinuous method for producing a cellulose solution is known from WO 96/33302. In this case, first a suspension of the cellulose in aminoxide solution is formed, from which water is evaporated before the production of the cellulose solution in a separate apparatus. It is disadvantageous in this case that the cellulose activation in the aqueous aminoxide solution is limited and a separate thermal step is necessary for concentration. The soluble components of the pulp reach the spinning solution and may lead to disadvantageous properties of the cellulose products.

Furthermore, producing a cellulose suspension in aqueous N-methylmorpholine-N-oxide (NMMO) by mixing the shredded cellulose directly in an annular layer mixer with the aqueous, e.g. 75 mass-percent NMMO is known from WO 96/33221. The suspension produced is brought to solution in a separate Filmtruder. It is disadvantageous in the annular layer mixer that only shredded, essentially dry cellulose may be used. If the cellulose contains water, the layer formation in the mixer and the mixing with the separately added NMMO solution is made more difficult. The water must be thermally separated in this case as well. The same disadvantages exist as in the method described in WO 96/33302. Since the suspension is transported as a layer, the throughput related to the apparatus cross-section is low.

Suspending the pulp before the formation of a homogeneous suspension in aminoxide solution in water and separating it again partially from the suspension agent after a certain time is known from German Patent 198 37 210.8. Recirculation of the suspension agent is not described.

The present invention has the object of providing a method and a device for the continuous production of an extrusion solution for the formation of cellulosic molded bodies according to the lyocell method, in which the pulp used is activated so that its solubility and speed of dissolving is elevated. In addition, soluble impurities of the pulp are to be partially separated in the method, so that their transition into the extrusion solution is reduced. Furthermore, a method for the continuous production of an extrusion solution for the lyocell method is to be provided which is distinguished by reduced consumption of thermal energy for water separation and by reduced thermal stress of the aminoxide and cellulose. Further advantages result from the following description.

These objects are achieved according to the present invention with the method initially described in that (a) a cellulose suspension is formed from pulp and an aqueous phase in a mass ratio in the range from 1:3 to 1:40 and maintained for a period of time in the range from 5 to 200 minutes with shearing, (b) the cellulose suspension is dewatered to form a material with a cellulose content in the range from 20 to 80 mass-percent and the aqueous phase resulting in this case is at least partially recycled in step (a), (c) the damp cellulose material is conveyed, with homogenization, through a first shear zone in the absence of N-methylmorpholine-N-oxide, (d) the homogenized cellulose material is conveyed through a second shear zone after the addition of enough aqueous N-methylmorpholine-N-oxide that after mixing a suspension with a content of N-methylmorpholine-N-oxide in the liquid phase in a range from 70 to 80 mass-percent results, and (e) the cellulose suspension in aqueous N-methylmorpholine-N-oxide produced is converted into the extrusion solution by water evaporation with shearing.

In contrast to known methods, in which the pulp is mixed directly with N-methylmorpholine-N-oxide (NMMO), in the method according to the present invention, a stronger activation and an increase in solubility of the cellulose is achieved by the aminoxide-free steps (a) to (c), so that the formation of solution in step (e) is accelerated and eased. Soluble attendant materials of the pulp may be washed out and partially removed from the method by the aminoxide-free steps (a) and (b) if only a part of the aqueous phase arising in step (b) is recycled in step (a) and otherwise fresh water is used. Since, according to the present invention, thermal concentration of the cellulose suspension in aqueous NMMO before the step of solution formation is dispensed with, reduced thermal stress of the solution components results. The preferred mass ratio of cellulose/aqueous phase in step (a) is in the range from 1:10 to 1:30. The preferred duration of the shearing treatment of the suspension in step (a) is in the range from 10 to 120 minutes. The preferred cellulose content of the dewatered damp cellulose material in step (b) is in the range from 40 to 60 mass-percent.

According to the preferred embodiment, partly the aqueous phase from step (b) and partly fresh water is used for the production of the cellulose suspension in step (a). The remaining portion of the aqueous phase from step (b) is discarded. Soluble components carried along with the pulp are thus prevented from reaching the spinning solution in too high a proportion. On the other hand, the fine fiber component contained in the aqueous phase from step (b) is at least partially recycled and the loss of cellulose is thus minimized.

An aqueous phase is preferably used in step (a) which may contain soluble components, preferably up to 1 mass-percent.

In the preferred embodiment of the method according to the present invention, the cellulose suspension is dewatered with the aid of vacuum and/or pressure into a fleece and the water content of the fleece is determined with the aid of an infrared moisture measurement and the measured dimension is used to regulate the predetermined pressure parameter and/or the addition of the aqueous NMMO in step (d).

Through this regulation, it is possible to continuously maintain the desired composition of the extrusion solution, so that optimum properties of the extruded cellulosic molded bodies may be obtained.

The production of the cellulose solution is preferably performed in step (e) in a strong shear field with small heat exchange areas up to a $NMMO/H_2O$ mol ratio in the range from 1:0.8 to 1:1.2. The energy necessary for water evaporation in this step is predominantly introduced into the viscous solution phase by shearing. In this way, and through the low addition of energy, localized overheating, and thus damage to the components of the extrusion solution, is avoided and the risk of the occurrence of exothermic reaction cycles is avoided. The water evaporation can also be regulated with less danger (runaway reaction) via the shear energy introduced than solely through the supply of heat via exchange surfaces.

In a separate embodiment of the method, the cellulose is enzymatically activated in step (a) or between steps (a) and (b) by treating the cellulose suspension with 0.01 to 10 mass-percent enzyme, in relation to the cellulose, at a temperature in the range between 20 and 70° C., at a pH value in the range from 3 to 10, and for a duration in the range from 0.1 to 10 hours. The cellulose is more strongly activated for the dissolving procedure by this enzymatic treatment than by the shear treatment in step (a) alone. The dissolving of the cellulose in step (e) is thus accelerated; the cellulose solution formed is less viscous or is more concentrated at the same viscosity. Suitable enzymes (cellulases) are known in the related art, such as Rucolase from the firm Rudolph Chemie or Roglyr 1538 from the firm Rotta GmbH. The enzymatic treatment is particularly performed at 30 to 60° C. and at a pH value of 4.5 to 8 with 0.1 to 3.0 mass-percent cellulase during a period of 0.5 to 2 hours.

In a further embodiment of the method according to the present invention, at least steps (a) and (b) are performed following the pulp production in the pulp factory. These treatment steps may additionally include the enzymatic treatment. The performance of these steps during the pulp production has the advantage that the activation is possible with lower outlay than at the fiber or film producer, because apparatuses and experience in pulp treatment with aqueous media are available in the pulp factory. The fiber or film producer obtains a pulp activated according to his specifications, with which he can immediately begin step (c) of the method according to the present invention.

According to the present invention, the device for performing the method comprises a mixing tank with suspending elements, supply connecting pieces for pulp and aqueous suspension agent and drain connecting pieces for the suspension produced, a separating apparatus connected to the drain connecting pieces for partial separation of the suspension agent from the pulp, a return line for separated suspension agent, which leads from the separating apparatus to the supply connecting pieces for suspension agent on the mixing tank, a shearing apparatus, including a homogenization zone and an adjoining suspending zone, having a first feed connecting piece for pulp from the separation apparatus to the beginning of the homogenization zone, a second feed connecting piece for aqueous solvent at the beginning of the suspending zone, and a drain connecting piece for suspension at the end of the suspending zone, and a concentration and dissolving apparatus, having a feed connecting piece connected to the drain connecting pieces of the shear apparatus described, a solvent outlet connecting piece at the other end, and at least one vapor outlet connecting piece. This facility allows the continuous performance of the method.

The individual apparatuses may be differently implemented in this case. A suitable mixing tank for the suspending in aqueous suspension agent may be, for example, a pulper known in the related art. A suitable separating apparatus is preferably a vacuum screen belt press.

The present invention will now be described with reference to the drawing and the examples.

The FIGURE schematically shows a facility for performing the method according to the present invention. A mixing tank 1 is fed pulp via connecting pieces 3. Suspension agent, comprising the aqueous recycled material supplied via a return line 4 and fresh water introduced via line 5, is supplied via connecting pieces 2. The aqueous pulp suspension formed in container 1 reaches a screen belt press 8 via line 7 from connecting pieces 6, on which it is dewatered down to a liquid content of 50%. The suspension agent separated in this way, which carries along components dissolved from the pulp and fine fiber material, is recycled through return line 4 into mixing tank 1. A part of the recycled material may be discarded through line 9.

The dewatered pulp obtained on screen belt press 8 is supplied in fleece form via funnel 12 to a double shaft apparatus 11. In apparatus 11, multiple shafts having shear and conveyor elements are arranged, of which two shafts 13, 14 are illustrated in the drawing. In a first shear zone, which reaches over approximately the first third of the overall length of both zones, the shafts for the shearing of the aqueous cellulose introduced are set up. After approximately one-third of the apparatus length, there is a feed opening 15 for the solvent (aqueous NMMO) in the cylinder housing. Air and some water vapor is drawn off through lines 16. The apparatus is connected to the downstream end to a multishaft slusher 18, which is used as a dissolving station, by a tube 17. The suspension is transported by the superstructures of the shafts, with shearing and dissolving of the cellulose, to output connecting pieces 19. Slusher 18 is kept under a partial vacuum by connecting pieces 20, which causes water to evaporate from the suspension and be drawn off from slusher 18. Both apparatuses 11 and 18 are provided with a heating mantle (not shown), so that the desired mixing and/or dissolving temperature may be maintained.

EXAMPLE 1

70 kg pulp of the type MoDo with 6% moisture was suspended in a pulper with 1300 l of completely desalinated water for approximately 10 minutes. A pulp suspension having 5 mass-percent pulp was produced. The suspension was fed at 50° C. and at a speed of 700 kg/h to a vacuum dewatering press, on which the pulp was dewatered to a moisture content of 50%. 70 kg/h of the damp pulp was fed to the first shear zone of a shear apparatus schematically indicated in the FIGURE. At the beginning of the second shear zone, 236 kg/h of aqueous N-methylmorpholine-N-oxide was introduced. The mixture was conveyed through the second shear zone, with the available apparatus cross-section being filled up essentially completely by the media conveyed. The slurry obtained had an NMMO content of 76.3%. 306 kg/h of slurry was then dewatered further in an evaporator/slusher with a strong shearing field and small heat exchange surfaces until a homogeneous solution with an $NMMO/H_2O$ mol ratio of 1:1 was formed. 270 kg/hour of spinning solution with a cellulose content of 12.3% was obtained, which was drawn off from the aggregate at the temperature of 94.5° C. The spinning solution could be assessed as good with reference to the refraction index, the particle content, the particle distribution in the solution, and its zero shear viscosity.

EXAMPLE 2

70 kg of a pulp, which resulted in very poor spinning solution qualities under the method conditions of example 1, was whipped in a turbo slusher in water at 45° C. and a pH value of 7 in a bath ratio of 1:10, and treated with 1.5 mass-percent enzyme, in relation to cellulose, for 1.5 hours. The suspension formed was fed to a vacuum dewatering press at 50° C. and a speed of 700 kg/h. In this way, the pulp was dewatered to a moisture content of 50%. The further processing of the fleece obtained was the same as an example 1. A spinning solution with good quality features was also obtained.

EXAMPLE 3

34 kg/h of a pulp enzymatically pretreated in the pulp factory (0.5% cellulase of the type Roglyr 1538 from the firm Rotta GmbH, in relation to cellulose, moisture content 6%) was metered with the aid of a shredder having a discharge unit into a crusher via a belt weigher. The 34 kg/h was supplied with homogenization to a first shearing zone and, after the addition of 272 kg/h of 76% NMMO, conveyed through a second shear zone. The resulting slurry had an NMMO content of 76.3%. The slurry was processed further in the same way as in example 1. The spinning solution had the same good properties as in example 1.

What is claimed is:

1. A method for the continuous production of an extrusion solution for the formation of cellulosic molded bodies, such as fibers and films, according to the lyocell method, comprising:
   (a) forming a cellulose suspension comprising cellulose pulp and an aqueous phase in a mass ratio in the range from 1:3 to 1:40 and shearing the cellulose suspension in a first shear zone for a period of time in the range from 5 to 200 minutes, wherein the cellulose suspension further comprises cellulose fine fibers and soluble impurities;
   (b) dewatering the cellulose suspension to form a damp cellulose material with a cellulose content in the range from 20 to 80 mass-percent, wherein a portion of the aqueous phase from the dewatering is discarded and a portion is recycled for subsequent use in step (a), thereby removing at least a portion of soluble impurities from the aqueous phase while recycling at least a portion of the fine cellulose fibers,
   (c) conveying the damp cellulose material through a second shear zone in the absence of N-methylmorpholine-N-oxide, wherein the damp cellulose material is homogenized in the second shear zone, and wherein the solubility of the damp cellulose material is increased;
   (d) adding a sufficient amount of aqueous N-methylmorpholine-N-oxide to the homogenized damp cellulose material to form a cellulose suspension with a content of N-methylmorpholine-N-oxide in the liquid phase in a range from 70 to 80 mass-percent and conveying the homogenized suspension through a third shear zone with the cellulose material essentially completely filling up the available conveyor cross-section in the shear zones; and
   (e) converting the cellulose suspension in aqueous N-methylmorpholine-N-oxide into the extrusion solution by evaporating water evaporation with shearing in a fourth shear zone thereby reducing localized overheating and damage to the extrusion solution.

2. The method according to claim 1, wherein the portion of the recycled aqueous phase from step (b) is combined with fresh water for formation of the cellulose suspension in step (a).

3. The method according to claim 1, wherein the aqueous phase used in step (a) contains dissolved components.

4. The method according to claim 1, wherein the cellulose suspension is dewatered in step (b) with the aid of vacuum and/or pressure into a fleece and sensing of the water content of the fleece is determined with the aid of an infrared moisture measurer and is used to regulate the predetermined pressure parameter and/or the addition of the aqueous N-methylmorpholine-N-oxide in step (d).

5. The method according to claim 1, wherein the formation of the cellulose solution in step (e) is performed in a strong shear field with small heat exchange surfaces up to an $NMMO/H_2O$ mol ratio in the range from 1:0.8 to 1:1.2.

6. The method according to claim 1, wherein the cellulose is enzymatically activated in step (a) by treating the cellulose suspension with 0.01 to 10 mass-percent enzyme, in relation to cellulose, at a temperature in the range between 20 and 70° C. and a pH value in the range from 3 to 10 for a duration in the range from 0.1 to 10 hours.

7. The method according to claim 6, wherein the enzymatic treatment is performed with 0.1 to 3.0 mass-percent enzyme at 30 to 60° C. and a pH value of 4.5 to 8 for a duration of 0.5 to 2 hours.

8. The method according to claim 6, wherein the enzyme is a cellulase.

9. The method according to claim 1, wherein steps (a) and (b) are performed in the pulp factory.

10. The method according to claim 1 wherein the cellulose is enzymatically activated between steps (a) and (b), by treating the cellulose suspension with 0.01 to 10 mass-percent enzyme, in relation to cellulose, at a temperature in the range between 20 and 70° C. and a pH value in the range from 3 to 10 for a duration in the range from 0.1 to 10 hours.

11. The method according to claim 10, wherein the enzyme is a cellulase.

12. A device for the continuous production of an extrusion solution for the formation of cellulosic molded bodies, such as fibers and films, according to the lyocell method, comprising:
   a mixing tank with suspending elements with means for shearing of contained solutions;
   a pulp supply connecting piece for introducing pulp into the mixing tank;
   an aqueous suspension agent supply connecting piece for introducing an aqueous suspension agent into the mixing tank;
   a separating apparatus communicatively connected to the mixing tank wherein the separating apparatus is used for partial dewatering a formed aqueous pulp suspension;
   a drain connecting piece communicatively connected to and between the mixing tank and the separating apparatus for removing a portion of the solution from the system;
   a return line connected to the separating apparatus for returning any aqueous suspension agent separated from the separating apparatus to the aqueous supply connecting piece of the mixing tank;
   a shearing apparatus including a first homogenization zone and adjoining suspending zone, having a first feed connecting piece for introducing pulp fleece from the separating apparatus at the beginning of the homogenization zone, a second feed connecting piece at the beginning of the suspending zone for introducing solvent, and a drain connecting piece for removing suspension at the end of the suspending zone, wherein the first homogenization zone and the adjoining suspending zone further comprise means for shearing the pulp fleece; and a concentration and dissolving apparatus communicatively connected at a first end to the drain connecting piece of the shearing apparatus, a solution outlet connecting piece at the other end of the dissolving apparatus, and at least one vapor outlet connecting piece.

13. The device according to claim 12, wherein the separating apparatus is a vacuum screen belt press.

14. The device according to claim 12, wherein the separating apparatus is a vacuum screen drum filter.

15. A method for the continuous production of an extrusion solution for the formation of cellulosic molded bodies, such as fibers and films, according to the lyocell method, wherein (a) forming a cellulose suspension comprising pulp and an aqueous phase in a mass ratio in the range from 1:3 to 1:40 and shearing the cellulose suspension for a period of time in the range from 5 to 200 minutes;

(b) dewatering the cellulose suspension to form a fleece material with a cellulose content in the range from 20 to 80 mass-percent, wherein a portion of dewatered aqueous phase is reused for forming the cellulose suspension and a portion of the aqueous phase is discarded thereby removing at least a portion of impurities in the aqueous phase;

(c) shearing the fleece material in the absence of N-methylmorpholine-N-oxide, to form a homogenized cellulose material;

(d) adding a sufficient amount of aqueous N-methylmorpholine-N-oxide to the homogenized cellulose material to form a cellulose suspension with a content of N-methylmorpholine-N-oxide in the liquid phase in a range from 70 to 80 mass-percent and shearing the cellulose suspension in aqueous N-methylmorpholine-N-oxide to evaporate excess water and form the extrusion solution.

* * * * *

UNITED STATES PATENT AND TRADEMARK OFFICE
CERTIFICATE OF CORRECTION

| | | |
|---|---|---|
| PATENT NO. | : 6,972,102 B1 | Page 1 of 1 |
| APPLICATION NO. | : 10/088773 | |
| DATED | : December 6, 2005 | |
| INVENTOR(S) | : Ralf-Uwe Bauer et al. | |

It is certified that error appears in the above-identified patent and that said Letters Patent is hereby corrected as shown below:

On the Title Page, Item (57) the entire Abstract should read

-- A method for the continuous production of an extrusion solution for the formation of cellulosic molded bodies, such as fibers and films, according to the lyocell method, in which (a) a cellulose suspension is formed from pulp and an aqueous phase in a mass ratio in the range from 1:3 to 1:40 and maintained for a period of time in the range from 5 to 200 minutes with shearing, (b) the cellulose suspension is dewatered to form a material with a cellulose content in the range from 20 to 80 mass-percent and the aqueous phase resulting in this case is at least partially recycled in step (a), (c), the damp cellulose material is conveyed, with homogenization, through a first shear zone in the absence of N-methylmorpholine-N-oxide, (d) the homogenized cellulose material is conveyed through a second shear zone after the addition of enough aqueous N- methylmorpholine-N-oxide that after the mixing a suspension with a content of N- methylmorpholine-N-oxide in the liquid phase in a range from 70 to 80 mass-percent results, with the cellulose material filling up the available conveyor cross-section in the shear zones essentially completely, and (e) the cellulose suspension in aqueous N- methylmopholine-N-oxide formed is converted into the extrusion solution by water evaporation with shearing. --

Signed and Sealed this

Twelfth Day of September, 2006

JON W. DUDAS
*Director of the United States Patent and Trademark Office*